United States Patent
Wang et al.

(10) Patent No.: US 10,880,817 B2
(45) Date of Patent: Dec. 29, 2020

(54) WI-FI CONFIGURATION METHOD, WI-FI MOBILE TERMINAL, AND WI-FI DEVICE

(71) Applicant: HUAWEI TECHNOLOGIES CO., LTD., Guangdong (CN)

(72) Inventors: Shunbao Wang, Shenzhen (CN); Jianfeng Xu, Shenzhen (CN); Chen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

(21) Appl. No.: 16/301,188

(22) PCT Filed: May 10, 2017

(86) PCT No.: PCT/CN2017/083797
§ 371 (c)(1),
(2) Date: Nov. 13, 2018

(87) PCT Pub. No.: WO2017/193937
PCT Pub. Date: Nov. 16, 2017

(65) Prior Publication Data
US 2019/0141614 A1 May 9, 2019

(30) Foreign Application Priority Data

May 13, 2016 (CN) .......................... 2016 1 0319699

(51) Int. Cl.
*H04W 48/10* (2009.01)
*H04W 48/16* (2009.01)
(Continued)

(52) U.S. Cl.
CPC ........... *H04W 48/10* (2013.01); *H04L 1/0061* (2013.01); *H04W 8/005* (2013.01);
(Continued)

(58) Field of Classification Search
CPC ................ H04W 8/005; H04W 12/00; H04W 12/00516; H04W 48/10; H04W 48/16; H04W 48/20; H04W 76/11
See application file for complete search history.

(56) References Cited

U.S. PATENT DOCUMENTS

| | | | | |
|---|---|---|---|---|
| 2011/0282961 | A1* | 11/2011 | Montemurro | ....... H04L 63/0892 709/207 |
| 2014/0226817 | A1* | 8/2014 | Von Huben | ............. H04L 61/35 380/270 |

(Continued)

FOREIGN PATENT DOCUMENTS

| | | |
|---|---|---|
| CN | 1952005 A | 4/2007 |
| CN | 103428815 A | 12/2013 |

(Continued)

OTHER PUBLICATIONS

Office Action issued in Chinese Application No. 201610319699.7 dated May 31, 2019, 19 pages (with English translation included).
Extended European Search Report issued in European Application No. 17765555.6 dated Dec. 13, 2018, 10 pages.
International Search Report and Written Opinion issued in International Application No. PCT/CN2017/083797 dated Jul. 18, 2017, 23 pages.

*Primary Examiner* — Pao Sinkantarakorn
(74) *Attorney, Agent, or Firm* — Fish & Richardson P.C.

(57) ABSTRACT

This application provides a Wi-Fi configuration method, a Wi-Fi mobile terminal, and a Wi-Fi device. The Wi-Fi mobile terminal constructs an information string according to obtained Wi-Fi networking parameters, adds information of the information string to a plurality of multicast packets, and sends the plurality of multicast packets to the Wi-Fi device. The Wi-Fi device parses the plurality of received multicast packets according to a method for carrying the information string by the multicast packets, decapsulates the information string according to a method for constructing the information string, to obtain the Wi-Fi networking parameters, and further sends a connection request to a wireless router according to the obtained Wi-Fi networking
(Continued)

parameters, to establish a connection to the wireless router. An AP to which the Wi-Fi mobile terminal is connected does not need to be switched, so that initial networking configuration of the Wi-Fi device can be quickly completed.

2 Claims, 7 Drawing Sheets

(51) Int. Cl.
*H04W 12/00* (2009.01)
*H04W 8/00* (2009.01)
*H04W 76/11* (2018.01)
*H04L 1/00* (2006.01)
*H04W 48/20* (2009.01)
*H04W 84/12* (2009.01)
*H04W 80/02* (2009.01)

(52) U.S. Cl.
CPC ......... *H04W 12/003* (2019.01); *H04W 48/16* (2013.01); *H04W 48/20* (2013.01); *H04W 76/11* (2018.02); *H04W 80/02* (2013.01); *H04W 84/12* (2013.01)

(56) References Cited

U.S. PATENT DOCUMENTS

| | | | |
|---|---|---|---|
| 2015/0097689 A1* | 4/2015 | Logue | H04L 65/1036 340/632 |
| 2015/0181505 A1 | 6/2015 | Deng et al. | |
| 2016/0037436 A1 | 2/2016 | Spencer et al. | |
| 2017/0257475 A1* | 9/2017 | Zong | H04W 12/06 |

FOREIGN PATENT DOCUMENTS

| | | |
|---|---|---|
| CN | 103825788 A | 5/2014 |
| CN | 103945369 A | 7/2014 |
| CN | 104469789 A | 3/2015 |
| CN | 104735747 A | 6/2015 |
| CN | 105897691 A | 8/2016 |
| EP | 2887587 A1 | 6/2015 |
| EP | 2999271 A1 | 3/2016 |
| WO | 2014195562 A1 | 12/2014 |

* cited by examiner

WI-FI CONFIGURATION METHOD, WI-FI MOBILE TERMINAL, AND WI-FI DEVICE

This application is a National stage of International Application No. PCT/CN2017/083797, filed on May 10, 2017, which claims priority to Chinese Patent Application No. 201610319699.7, filed on May 13, 2016. Both of the aforementioned applications are hereby incorporated by reference in their entireties.

TECHNICAL FIELD

Embodiments of this application relate to the field of communications technologies, and in particular, to a Wi-Fi configuration method, a Wi-Fi mobile terminal, and a Wi-Fi device.

BACKGROUND

Wireless Fidelity (Wireless Fidelity, Wi-Fi for short) is a technology that connects wireless terminal devices in a wireless manner, and is a wireless network connection technology that is most widely used at the present stage. At present, for a Wi-Fi device that has an input/output device, the Wi-Fi device allows a user to directly configure Wi-Fi networking parameters by using the input/output device (for example, a keyboard or a screen), so that the Wi-Fi device actively connects to a wireless router by using these Wi-Fi networking parameters. However, for a Wi-Fi device that has no input/output device, no Wi-Fi networking parameter can be directly configured for the Wi-Fi device. Therefore, a problem that needs to be urgently resolved is how to configure Wi-Fi networking parameters on the Wi-Fi device that has no input/output device, so that the Wi-Fi device connects to a wireless router.

At present, for the Wi-Fi device that has no input/output device, the Wi-Fi networking parameters are configured on the Wi-Fi device mainly by using a wireless access point (Access Point, AP for short). Specifically, after a Wi-Fi device in an AP mode is powered on, a Wi-Fi mobile terminal connected to an AP of a router may discover the Wi-Fi device through scanning. In this case, the Wi-Fi mobile terminal is triggered to disconnect from the AP of the router, and is then connected to an AP of the Wi-Fi device. In addition, the Wi-Fi mobile terminal is triggered to send Wi-Fi networking parameters of the router to the Wi-Fi device, so that the Wi-Fi device switches from the AP mode to a STA mode after receiving the Wi-Fi networking parameters, and in the STA mode, initiates a connection request to the AP of the router according to the Wi-Fi networking parameters, to connect to the AP of the router. Finally, after determining that the Wi-Fi device successfully connects to the AP of the router, the Wi-Fi mobile terminal disconnects from the AP of the Wi-Fi device, and reconnects to the AP of the router.

However, the foregoing wireless AP configuration process of the Wi-Fi device consumes a long time and is characterized by low efficiency. In addition, in the AP configuration process, the AP to which the Wi-Fi mobile terminal is connected needs to be switched. As a result, a connection between the Wi-Fi mobile terminal and the wireless router is in a disconnected state at a particular time. This affects a network connection status of the Wi-Fi mobile terminal. Consequently, a service on the Wi-Fi mobile terminal cannot be performed normally, thereby bringing inconvenience to a user and causing poor user experience.

SUMMARY

Embodiments of this application provide a Wi-Fi configuration method, a Wi-Fi mobile terminal, and a Wi-Fi device, to resolve a problem that an AP to which a Wi-Fi mobile terminal is connected needs to be switched in an existing Wi-Fi configuration process, and consequently configuration is time-consuming, a service of the Wi-Fi mobile terminal device cannot be performed, and user experience is poor.

According to a first aspect, an embodiment of the present invention provides a Wi-Fi configuration method. The method is described from a perspective of a Wi-Fi mobile terminal. In the method, the Wi-Fi mobile terminal obtains Wi-Fi networking parameters including attribute fields such as a Wi-Fi name and a Wi-Fi password, constructs an information string by using the Wi-Fi networking parameters, adds information of the information string to a plurality of multicast packets, and sends the multicast packets. According to the method, a Wi-Fi device receiving the multicast packets can perform corresponding processing such as parsing, and establish, according to the Wi-Fi networking parameters that are obtained through parsing, a connection to a wireless router corresponding to the Wi-Fi name, so that initial networking configuration of the Wi-Fi device can be quickly completed, without a need to switch an AP to which the Wi-Fi mobile terminal is connected. This resolves a problem that an AP to which a Wi-Fi mobile terminal is connected needs to be switched in an existing Wi-Fi configuration process, and consequently configuration is time-consuming, a service of the Wi-Fi mobile terminal device cannot be performed, and user experience is poor.

Optionally, in a possible implementation of the first aspect, the obtaining Wi-Fi networking parameters includes: receiving the Wi-Fi networking parameters entered by a user, or automatically obtaining the Wi-Fi networking parameters.

Optionally, in a possible implementation of the first aspect, before the obtaining Wi-Fi networking parameters, the method further includes: discovering, through scanning, an SSID externally released by the Wi-Fi device, and prompting the user to enable Wi-Fi configuration. According to the method, the Wi-Fi mobile terminal can discover surrounding SSIDs by using a scanning interface. The Wi-Fi mobile terminal has a function of actively discovering the Wi-Fi device, can identify the SSID released by the Wi-Fi device, and further displays the discovered Wi-Fi device by using a user interface, to prompt the user to enable Wi-Fi configuration.

Optionally, in a possible implementation of the first aspect, the constructing an information string by using the Wi-Fi networking parameters includes: encapsulating the Wi-Fi networking parameters by using a preset format, to form a plurality of attribute fields; combining the plurality of attribute fields in sequence to form an attribute field string; and adding, before the attribute field string, a string length value that represents a length of the attribute field string, to form the information string. According to the method, the Wi-Fi mobile terminal performs encapsulation and combination processing on the plurality of attribute fields including the Wi-Fi networking parameters, so that the formed information string follows a particular rule and the Wi-Fi device quickly obtains the Wi-Fi networking parameters by using a corresponding method such as decapsulation, thereby shortening a Wi-Fi configuration time.

Optionally, in a possible implementation of the first aspect, the adding information of the information string to a plurality of multicast packets specifically includes: determining a multicast IP address prefix and an IP address of a preamble multicast packet; and constructing the plurality of multicast packets by using the multicast IP address prefix, the IP address of the preamble multicast packet, and the information string, where the last two bytes of a destination MAC address of each multicast packet carry some information of the information string, and a length value of each multicast packet carries a send sequence number. According to the method, the Wi-Fi mobile terminal selects the multicast IP address prefix and the IP address of the preamble multicast packet, and adds the information of the information string to the last two bytes of destination MAC addresses of the multicast packets respectively. This can improve a capability of identifying the Wi-Fi mobile terminal by the Wi-Fi device, so that the Wi-Fi device performs targeted reception.

Optionally, in a possible implementation of the first aspect, the method further includes: after the Wi-Fi device successfully connects to the wireless router, receiving a Wi-Fi configuration success notification message sent by the Wi-Fi device; or after the Wi-Fi device fails to connect to the wireless router, discovering, through scanning, a Wi-Fi configuration failure cause that is transferred by the Wi-Fi device by using an updated SSID.

Optionally, in a possible implementation of the first aspect, the Wi-Fi networking parameters further include an IP address of the Wi-Fi mobile terminal and a port number of the Wi-Fi mobile terminal.

According to a second aspect, an embodiment of the present invention provides a Wi-Fi configuration method. The method is described from a perspective of a Wi-Fi device. The method includes: receiving a plurality of multicast packets, where the plurality of multicast packets carry an information string, the information string carries Wi-Fi networking parameters, and the Wi-Fi networking parameters include attribute fields: a Wi-Fi name and a Wi-Fi password; parsing the plurality of multicast packets according to a method for carrying the information string by the multicast packets, to obtain the information string; decapsulating the information string according to a method for constructing the information string, to obtain the Wi-Fi networking parameters; and sending, according to the Wi-Fi networking parameters, a connection request to a wireless router corresponding to the Wi-Fi name, to establish a connection to the wireless router. According to the method, the Wi-Fi device may send, according to the Wi-Fi networking parameters included in the information string, the connection request to the wireless router corresponding to the Wi-Fi name, and establish the connection to the wireless router, so that a user can quickly complete initial networking configuration of the Wi-Fi device, without a need to switch an AP to which a Wi-Fi mobile terminal is connected. This resolves a problem that an AP to which a Wi-Fi mobile terminal is connected needs to be switched in an existing Wi-Fi configuration process, and consequently configuration is time-consuming, a service of the Wi-Fi mobile terminal device cannot be performed, and user experience is poor.

Optionally, in a possible implementation of the second aspect, before the receiving a plurality of multicast packets, the method further includes: externally releasing an SSID, to trigger a Wi-Fi mobile terminal to discover the Wi-Fi device through scanning. In this embodiment, the Wi-Fi device can trigger, by externally releasing the SSID, the Wi-Fi mobile terminal to discover the Wi-Fi device through scanning, so as to perform Wi-Fi configuration in time.

Optionally, in a possible implementation of the second aspect, the decapsulating the information string according to a method for constructing the information string, to obtain the Wi-Fi networking parameters specifically includes: decomposing the information string according to the method for constructing the information string, to obtain an attribute field string of the information string and a string length value that represents a length of the attribute field string; decomposing the attribute field string according to a method for forming the attribute field string through combination, to obtain a plurality of attribute fields in the attribute field string; and decapsulating the plurality of attribute fields by using a preset format, to obtain the Wi-Fi networking parameters. According to the method, the Wi-Fi device parses the information string by using a method reverse to the method for constructing the information string by the Wi-Fi mobile terminal, so that the Wi-Fi networking parameters can be easily obtained and a Wi-Fi configuration process is simplified.

Optionally, in a possible implementation of the second aspect, the parsing the plurality of multicast packets according to a method for carrying the information string by the multicast packets, to obtain the information string specifically includes: locking, according to destination MAC address prefixes of the plurality of received multicast packets, Wi-Fi channels and multicast source MAC addresses of the multicast packets; identifying, according to the locked Wi-Fi multicast channels and multicast source MAC addresses, the plurality of multicast packets sent by the Wi-Fi mobile terminal; determining sequence numbers of the plurality of multicast packets according to a length value of each multicast packet; and obtaining information of the information string according to the sequence numbers of the plurality of multicast packets and the last two bytes of destination MAC addresses of the plurality of multicast packets. According to the technical solution in this embodiment of this application, a capability of identifying the Wi-Fi mobile terminal by the Wi-Fi device is improved, so that the multicast packets sent by the Wi-Fi mobile terminal can be received in time, thereby shortening a Wi-Fi configuration time and achieving high efficiency.

Optionally, in a possible implementation of the second aspect, the obtaining information of the information string according to the sequence numbers of the plurality of multicast packets and the last two bytes of destination MAC addresses of the plurality of multicast packets specifically includes: placing, according to the sequence numbers of the plurality of multicast packets, information string parts corresponding to the sequence numbers of the multicast packets to locations that are corresponding to the sequence numbers and that are in created buffer space, where a length of the buffer space is greater than a total length of the plurality of multicast packets; locating, according to a destination MAC address of a preamble multicast packet, a field in which a string length value of the information string is located and that is in the buffer space; obtaining the string length value according to the field in which the string length value is located, and determining, according to the string length value, whether the information string is completely received; and if the information string is completely received, completing the reception of the plurality of multicast packets according to the string length value, and after the plurality of multicast packets are completely received, stopping receiving the plurality of multicast packets, and obtaining the information of the information string; or if the information string is not completely received, continuing to receive a data packet that is missing from the information string, or clearing the buffer space and re-receiving the plurality of multicast packets. In this embodiment of this application, the Wi-Fi device first creates the buffer space used to receive the multicast packets, receives the multicast packets according to the sequence numbers of the multicast packets, and when the information string is completely received, obtains the Wi-Fi networking parameters of the wireless router. This improves correctness of transmitting the information string and improves a probability of Wi-Fi configuration success.

Optionally, in a possible implementation of the second aspect, the method further includes: after the Wi-Fi device successfully connects to the wireless router, sending a Wi-Fi configuration success notification message to the Wi-Fi mobile terminal; or after the Wi-Fi device fails to connect to the wireless router, changing the SSID of the Wi-Fi device, re-releasing an updated SSID, and transferring a Wi-Fi configuration failure cause to the Wi-Fi mobile terminal by using the updated SSID. In this embodiment, after the Wi-Fi device connects to the wireless router, the Wi-Fi device stops externally releasing the SSID, and feeds back the Wi-Fi configuration success notification to the Wi-Fi mobile terminal; or when the Wi-Fi device fails to connect to the wireless router, the Wi-Fi device releases the updated SSID, and transfers the failure cause to the Wi-Fi mobile terminal. In this way, the Wi-Fi mobile terminal can learn the Wi-Fi configuration failure cause in time according to the updated SSID.

Optionally, in a possible implementation of the second aspect, the Wi-Fi networking parameters further include an IP address of the Wi-Fi mobile terminal and a port number of the Wi-Fi mobile terminal.

According to a third aspect, an embodiment of the present invention provides a Wi-Fi mobile terminal. The Wi-Fi mobile terminal is configured to implement functions of the method performed by a Wi-Fi mobile terminal in the first aspect. The functions are implemented by hardware/software of the Wi-Fi mobile terminal. The hardware/software includes units corresponding to the functions.

According to a fourth aspect, an embodiment of the present invention provides a Wi-Fi device. The Wi-Fi device is configured to implement functions of the method performed by a Wi-Fi device in the second aspect. The functions are implemented by hardware/software of the Wi-Fi device. The hardware/software includes units corresponding to the functions.

According to a fifth aspect, an embodiment of the present invention provides a Wi-Fi mobile terminal, including a processor, a memory, a transceiver, a communications interface, and a system bus. The memory and the communications interface connect to and communicate with the processor and the transceiver by using the system bus. The memory is configured to store a computer-executable instruction. The communications interface is configured to communicate with another device. The processor is configured to run the computer-executable instruction, so that the Wi-Fi mobile terminal performs various steps of the foregoing method applied to a Wi-Fi mobile terminal.

According to a sixth aspect, an embodiment of the present invention provides a Wi-Fi device, including a processor, a memory, a transceiver, a communications interface, and a system bus. The memory and the communications interface connect to and communicate with the processor and the transceiver by using the system bus. The memory is configured to store a computer-executable instruction. The communications interface is configured to communicate with another device. The processor is configured to run the computer-executable instruction, so that the Wi-Fi device performs various steps of the foregoing method applied to a Wi-Fi device.

According to a seventh aspect, an embodiment of the present invention provides a Wi-Fi configuration system. The system includes the Wi-Fi mobile terminal, the Wi-Fi device, and the wireless router in the foregoing aspects. The Wi-Fi device establishes a connection to the wireless router by using the Wi-Fi mobile terminal.

According to an eighth aspect, an embodiment of the present invention provides a computer storage medium, configured to store a computer software instruction used by the foregoing Wi-Fi mobile terminal. The computer software instruction includes a program designed for executing the foregoing aspects.

According to a ninth aspect, an embodiment of the present invention provides a computer storage medium, configured to store a computer software instruction used by the foregoing Wi-Fi device. The computer software instruction includes a program designed for executing the foregoing aspects.

According to a tenth aspect, an embodiment of the present invention provides a chip system, including at least one processor, a memory, an input/output part, and a bus. The at least one processor obtains an instruction in the memory by using the bus, to implement a designed function of the Wi-Fi mobile terminal related to the foregoing methods.

According to an eleventh aspect, an embodiment of the present invention provides a chip system, including at least one processor, a memory, an input/output part, and a bus. The at least one processor obtains an instruction in the memory by using the bus, to implement a designed function of the Wi-Fi device related to the foregoing methods.

According to the Wi-Fi configuration method, the Wi-Fi mobile terminal, and the Wi-Fi device that are provided in the embodiments of this application, the Wi-Fi mobile terminal constructs the information string according to the obtained Wi-Fi networking parameters, adds the information of the information string to the plurality of multicast packets, and sends the plurality of multicast packets. The Wi-Fi device is in a special mode in which all packets in space can be received. The Wi-Fi device can obtain, through screening, the plurality of multicast packets sent by the Wi-Fi mobile terminal, and obtain, through parsing, the Wi-Fi networking parameters from the plurality of received multicast packets, to establish the connection to the wireless router. In this method, the AP to which the Wi-Fi mobile terminal is connected does not need to be switched, so that initial networking configuration of the Wi-Fi device can be quickly completed. This resolves a problem that an AP to which a mobile terminal is connected needs to be switched in an existing Wi-Fi configuration process, and consequently configuration is time-consuming, a service of the mobile terminal device cannot be performed, and user experience is poor.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show some embodiments of this application, and persons of ordinary skill in the art may still derive other drawings from these accompanying drawings without creative efforts.

DESCRIPTION OF EMBODIMENTS

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

A Wi-Fi configuration method provided in the embodiments of this application is mainly used to resolve a problem that an AP to which a Wi-Fi mobile terminal is connected needs to be switched in a Wi-Fi configuration process, and consequently configuration is time-consuming, a service of the Wi-Fi mobile terminal device cannot be performed, and user experience is poor.

The following describes a difference between a wireless router and a wireless AP. Specifically, the wireless access point (Access Point, AP for short) is a wireless switch in a wireless network. The wireless access point is an access point used by a Wi-Fi mobile terminal device to access a wired network, and is mainly used for home broadband and enterprise intranet deployment, and the like. Generally, the wireless AP has an access point client mode. That is, a wireless connection may be implemented between wireless APs, enlarging a coverage area of the wireless network. The wireless router is an extended AP, that is, a router having a wireless coverage function. The wireless router is mainly used for network access by a user and wireless coverage. By using a routing function, the wireless router can implement Internet connection sharing in a home wireless network and implement wireless shared access based on an ADSL and cell broadband. The embodiments of this application are mainly described by using the wireless router as an example.

Figure 1:
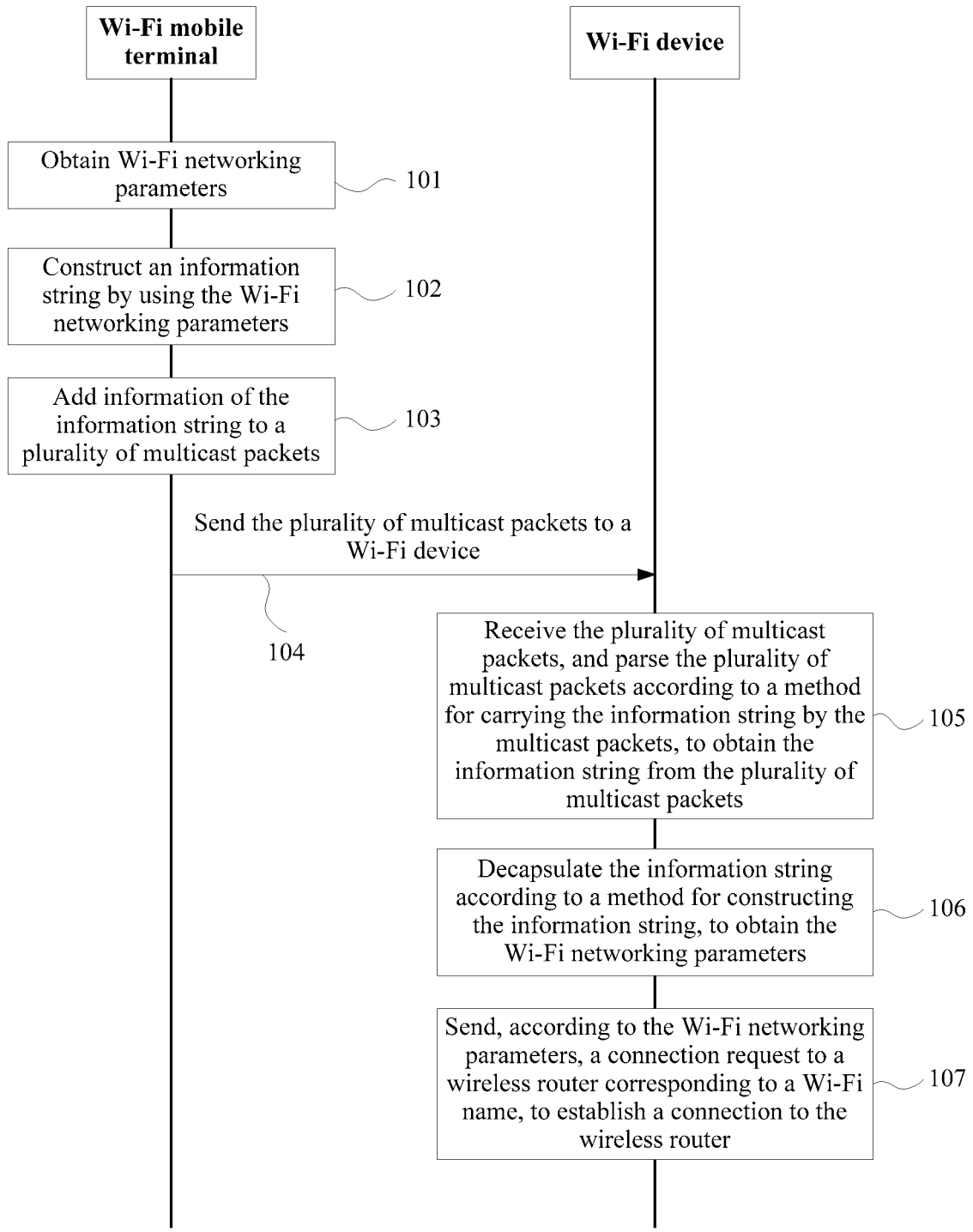
FIG. 1 is a schematic interaction diagram of Embodiment 1 of a Wi-Fi configuration method according to an embodiment of this application.

FIG. 1 is a schematic interaction diagram of Embodiment 1 of a Wi-Fi configuration method according to an embodiment of this application. According to the Wi-Fi configuration method provided in Embodiment 1 of this application, Wi-Fi configuration of a Wi-Fi device is implemented through information exchange between a Wi-Fi mobile terminal and the Wi-Fi device. Referring to FIG. 1, the Wi-Fi configuration method provided in Embodiment 1 of this application includes the following steps.

Step 101: A Wi-Fi mobile terminal obtains Wi-Fi networking parameters, where the Wi-Fi networking parameters include attribute fields: a Wi-Fi name and a Wi-Fi password.

The Wi-Fi mobile terminal and a wireless router are in a connected state. The Wi-Fi mobile terminal can learn the Wi-Fi networking parameters of the wireless router, or obtain the Wi-Fi networking parameters that are entered by a user by using a user interface. The Wi-Fi networking parameters may include attribute fields such as the Wi-Fi name (or referred to as a service set identifier (Service Set Identifier, SSID for short) of the wireless router) and the Wi-Fi password.

Optionally, the Wi-Fi mobile terminal may obtain the Wi-Fi networking parameters by receiving the Wi-Fi networking parameters entered by the user, by automatically obtaining the Wi-Fi networking parameters, or in another manner. The Wi-Fi mobile terminal receives the Wi-Fi networking parameters entered by the user, or may automatically obtain the Wi-Fi networking parameters without a need of input. A wireless router to which a Wi-Fi device needs to be connected may be determined according to the Wi-Fi networking parameters.

Step 102: The Wi-Fi mobile terminal constructs an information string by using the Wi-Fi networking parameters.

The wireless router is an extended wireless access point (Access Point, AP for short), and is a router having a wireless coverage function. The wireless router is mainly used for network access by a user and wireless coverage. By using a routing function of the wireless router, the wireless router can implement Internet connection sharing in a home wireless network and implement wireless shared access based on an asymmetric digital subscriber line (Asymmetric Digital Subscriber Line, ADSL for short) and cell broadband. The Wi-Fi mobile terminal codes the obtained Wi-Fi networking parameters to construct the information string that can be sent.

It should be noted that the Wi-Fi networking parameters carried in the information string include at least attribute fields such as the Wi-Fi name and the Wi-Fi password. Optionally, the Wi-Fi networking parameters may further include attribute fields such as a port number of an APP of the Wi-Fi mobile terminal and an IP address of the APP of the Wi-Fi mobile terminal.

Step 103: The Wi-Fi mobile terminal adds information of the information string to a plurality of multicast packets.

Step 104: The Wi-Fi mobile terminal sends the plurality of multicast packets to a Wi-Fi device.

The information string is carried in the last two bytes of destination MAC addresses of the plurality of multicast packets. A send sequence number of a multicast packet is carried in a packet length value of the multicast packet. The send sequence number of the multicast packet is used to identify a sending sequence of the packet.

Generally, if the Wi-Fi mobile terminal and the Wi-Fi device are not connected to a same Wi-Fi network, the Wi-Fi mobile terminal cannot directly send the constructed information string to the Wi-Fi device. In addition, because the Wi-Fi network is encrypted, the Wi-Fi device cannot decrypt a packet sent by the Wi-Fi mobile terminal if the Wi-Fi device does not know an SSID or a key of the Wi-Fi mobile terminal.

The Wi-Fi mobile terminal is connected to the Wi-Fi network, and sends a packet in a unicast, multicast, or broadcast manner. Unicast (Unicast) transmission is used between a sender and each receiver to implement a point-to-point network connection. The sender needs to know an IP address and a MAC address of the receiver. Multicast (Multicast) transmission is used between a sender and each receiver to implement a point-to-multipoint network connection. The sender does not need to know an IP address or a MAC address of the receiver, and only a device added to the multicast group receives a packet. Broadcast (Broadcast) transmission is used by a sender to perform sending for all receivers in a network. This may aggravate burden of a network device.

A main objective of this embodiment of this application is to complete initial networking configuration of the Wi-Fi device on a precondition that an AP to which the mobile phone is connected does not need to be switched. Therefore, the information string carrying the Wi-Fi networking parameters may need to be sent to some specified Wi-Fi devices at the same time, and may need to be sent to a plurality of Wi-Fi devices at the same time. To reduce network congestion and improve data transmission efficiency, the multicast manner is used to send the information string to the Wi-Fi device in this embodiment of this application.

A characteristic of multicast is used in the present invention, so that the Wi-Fi mobile terminal sends the multicast packets but does not need to know an IP address or a MAC address of the Wi-Fi device. A promiscuous mode can be set for the Wi-Fi device by modifying software of the Wi-Fi device, so that the Wi-Fi device can receive the multicast packets sent by the Wi-Fi mobile terminal. After the Wi-Fi device successfully receives the multicast packets including the Wi-Fi networking parameters, the software of the Wi-Fi device is modified, so that the Wi-Fi device can switch to a STA network adapter mode, and further the Wi-Fi device actively connects to the wireless router. How to modify the software of the Wi-Fi device belongs to the prior art, and details are not described herein. In addition, when the Wi-Fi mobile terminal is connected to the encrypted Wi-Fi network, a packet header (including an IP address and a MAC address) of each sent packet is not encrypted, and a packet body is encrypted. In this embodiment of the present invention, a packet MAC address that is not encrypted and that is visible to the Wi-Fi device is used to transfer information.

Step 105: The Wi-Fi device receives the plurality of multicast packets, and parses the plurality of multicast packets according to a method for carrying the information string by the multicast packets, to obtain the information string from the plurality of multicast packets.

Specifically, when the Wi-Fi device is not connected to the wireless router, the Wi-Fi device is in a to-be-configured state. In this state, the Wi-Fi device may receive all packets in space, may further obtain, through screening, the plurality of multicast packets sent by the Wi-Fi mobile terminal, and can obtain, through parsing, the information string from the last two bytes of the destination MAC addresses of the plurality of multicast packets.

Step 106: The Wi-Fi device decapsulates the information string according to a method for constructing the information string, to obtain the Wi-Fi networking parameters.

Optionally, that the Wi-Fi mobile terminal constructs the information string by using the Wi-Fi networking parameters and that the Wi-Fi device decapsulates the information string to obtain the Wi-Fi networking parameters are reverse processes. Therefore, the Wi-Fi device can decapsulate the information string according to the method for constructing the information string to obtain the Wi-Fi networking parameters included in the information string. Further, the Wi-Fi device can implement Wi-Fi configuration according to the Wi-Fi name and the Wi-Fi password in the Wi-Fi networking parameters, so as to connect to the wireless router.

Step 107: The Wi-Fi device sends, according to the Wi-Fi networking parameters, a connection request to a wireless router corresponding to the Wi-Fi name, to establish a connection to the wireless router.

The Wi-Fi device processes the received information string and obtains the Wi-Fi networking parameters in the information string. The Wi-Fi networking parameters include the Wi-Fi name and the Wi-Fi password. Therefore, the Wi-Fi device may initiate, according to the Wi-Fi name and the corresponding Wi-Fi password, the connection request to the wireless router corresponding to the Wi-Fi name, so as to implement the connection to the wireless router.

If the Wi-Fi device fails to connect to the wireless router, the Wi-Fi device re-receives the plurality of multicast packets sent by the Wi-Fi mobile terminal, re-parses the multicast packets to obtain the Wi-Fi networking parameters in the information string, and further performs connection according to the Wi-Fi networking parameters. If the Wi-Fi device successfully connects to the wireless router, the Wi-Fi device may feed back a connection success notification to the Wi-Fi mobile terminal, so that the Wi-Fi mobile terminal stops sending the multicast packets.

According to the Wi-Fi configuration method provided in Embodiment 1 of this application, the Wi-Fi mobile terminal constructs the information string according to the obtained Wi-Fi networking parameters, adds the information of the information string to the plurality of multicast packets, and sends the plurality of multicast packets to the Wi-Fi device. Correspondingly, the Wi-Fi device receives the plurality of multicast packets, parses the plurality of multicast packets according to the method for carrying the information string by the multicast packets, to obtain the information string from the plurality of multicast packets; decapsulates the information string according to the method for constructing the information string, to obtain the Wi-Fi networking parameters; and finally sends, according to the Wi-Fi networking parameters, the connection request to the wireless router corresponding to the Wi-Fi name, to establish the connection to the wireless router. According to the technical solution in this embodiment of this application, the Wi-Fi mobile terminal sends the Wi-Fi networking parameters of the wireless router to the Wi-Fi device by using the multicast packets and the information string, and does not need to establish a connection to the Wi-Fi device in advance. Therefore, the user can quickly complete initial networking configuration of the Wi-Fi device, without a need to switch the AP to which the Wi-Fi mobile terminal is connected. This resolves a problem that an AP to which a Wi-Fi mobile terminal is connected needs to be switched in an existing Wi-Fi configuration process, and consequently configuration is time-consuming, a service of the Wi-Fi mobile terminal device cannot be performed, and user experience is poor.

Figure 2:
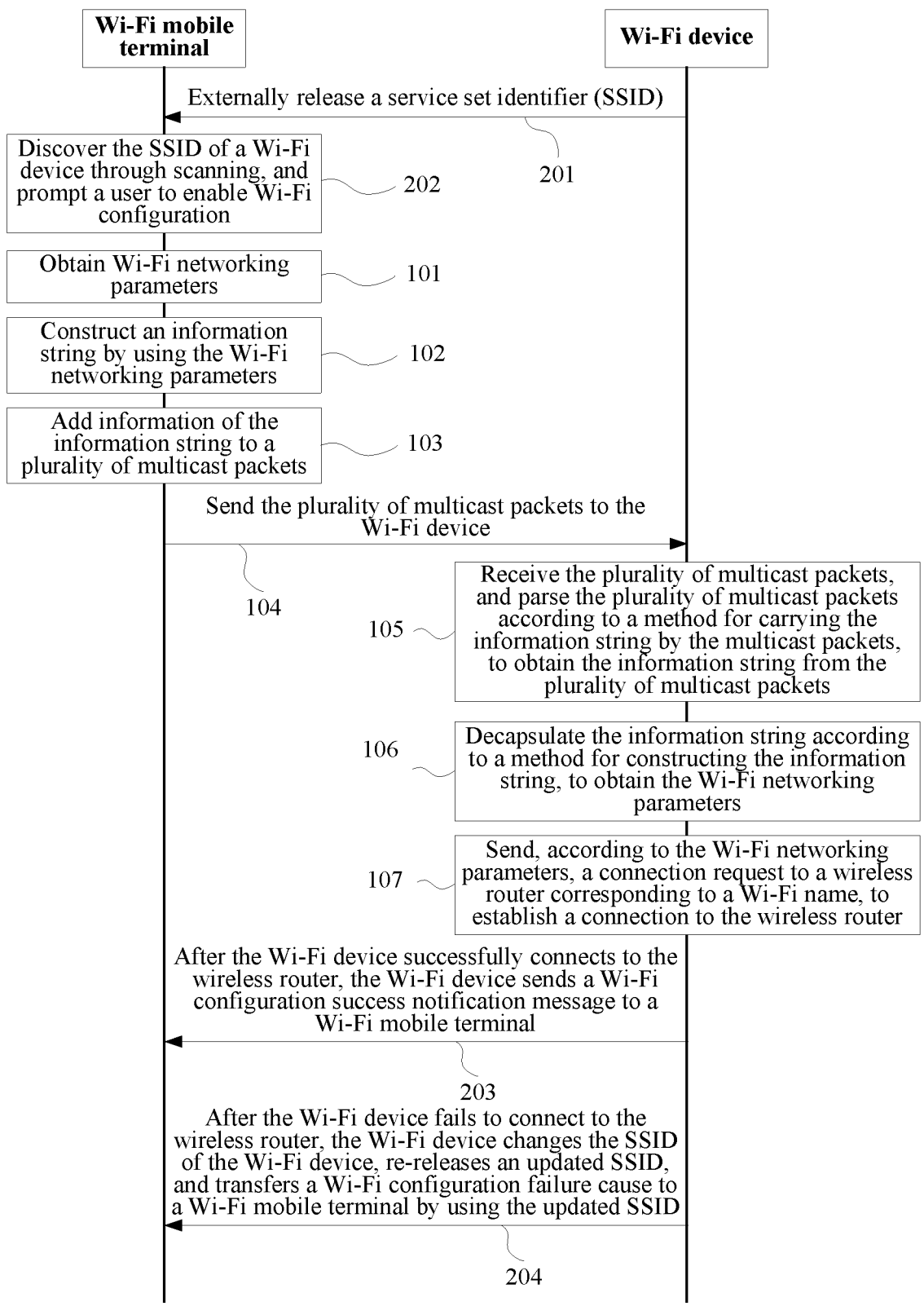
FIG. 2 is a schematic interaction diagram of Embodiment 2 of a Wi-Fi configuration method according to an embodiment of this application.

FIG. 2 is a schematic interaction diagram of Embodiment 2 of a Wi-Fi configuration method according to an embodiment of this application. Based on Embodiment 1, Embodiment 2 of this application further describes the Wi-Fi configuration method. As shown in FIG. 2, before step 101, the Wi-Fi configuration method provided in Embodiment 2 of this application further includes the following steps.

Step 201: The Wi-Fi device externally releases a service set identifier (SSID).

The Wi-Fi device is in an unconfigured state upon delivery, and externally provides the customized SSID that represents an identity of the Wi-Fi device. After obtaining the customized SSID through scanning, the APP of the Wi-Fi mobile terminal obtains identity information of the Wi-Fi device from an SSID name according to a customization rule, and prompts the user, for example, "A new device is discovered: a Wi-Fi camera of a company. Please determine whether to configure it." The SSID may be used to indicate a configuration protocol version number, a manufacturer identifier ID, a device type identifier ID, a device serial number (Serial Number, SN for short), and a device model that are of the Wi-Fi device. Therefore, different SSIDs may indicate different device versions, different manufacturers, different device types, different device SNs, and different device models. Therefore, before the Wi-Fi mobile terminal constructs the information string by using the Wi-Fi networking parameters of the wireless router, the Wi-Fi device externally releases the SSID of the Wi-Fi device, so that the Wi-Fi mobile terminal can discover, through scanning, the Wi-Fi device in time.

In this embodiment of this application, a format of naming the SSID of the Wi-Fi device is:

"HiLink_XYYYZZZUUUAAV"

(d) X: indicates an interconnection protocol version number, and occupies one character (only a hexadecimal character is allowed, and a value range is "0" to "F").

(e) YYY: indicates the manufacturer ID, and occupies three characters (only a hexadecimal character is allowed, and a value range is "000" to "FFF"). For example, "001" indicates Huawei.

(f) ZZZ: indicates the device type ID, and occupies three characters (only a hexadecimal character is allowed, and a value range is "000" to "FFF"). For example, "001" indicates a router.

(g) UUU: indicates the device SN, and occupies three characters (a value range includes visible characters of ASCII codes). The last three digits of the device SN are used, for example, "002".

(h) AA: occupies two characters (a value range includes visible characters of ASCII codes), and indicates a working state and a capability of the device. For example, "01" indicates that the device is in a to-be-configured state and supports multicast interconnection; "G1" indicates that the device has completed configuration negotiation but fails to connect to router Wi-Fi because a password is incorrect, and supports multicast interconnection.

(i) V: indicates a device certification number. A length is variable and cannot exceed 10 characters. For example, "2" indicates a Huawei router WS832.

Step 202: The Wi-Fi mobile terminal discovers the SSID of the Wi-Fi device through scanning, and prompts a user to enable Wi-Fi configuration.

For the Wi-Fi mobile terminal, some systems installed on the Wi-Fi mobile terminal do not open a scanning interface. For example, a Wi-Fi mobile terminal on which an IOS system is installed does not open a scanning interface. Therefore, the Wi-Fi mobile terminal cannot discover, by scanning surrounding SSIDs, a Wi-Fi device that needs to be configured, and can only guide, by using a user interface (User Interface, UI for short) of the Wi-Fi mobile terminal, the user to perform a related task.

However, for a Wi-Fi mobile terminal having an Android system, the Wi-Fi mobile terminal opens a scanning interface, and can discover surrounding SSIDs by scanning the interface. Therefore, the Wi-Fi mobile terminal has a function of actively discovering a Wi-Fi device, can identify an SSID that is of the Wi-Fi device and that is released by the Wi-Fi device, and further displays the discovered Wi-Fi device by using a user interface, so that the user selects the to-be-connected Wi-Fi device.

Further, after step 107, the Wi-Fi configuration method provided in this embodiment of this application further includes the following step:

Step 203: After the Wi-Fi device successfully connects to the wireless router, the Wi-Fi device sends a Wi-Fi configuration success notification message to the Wi-Fi mobile terminal.

Specifically, the Wi-Fi networking parameters include the Wi-Fi name and the Wi-Fi password that are of the wireless router to which the Wi-Fi device is to connect. Therefore, after obtaining the correct Wi-Fi parameters, the Wi-Fi device can connect to the router by using the Wi-Fi networking parameters. Correspondingly, the Wi-Fi device does not need to externally release the SSID to make the Wi-Fi mobile terminal perform identification. Therefore, the Wi-Fi device stops externally releasing the SSID, and feeds back the Wi-Fi configuration success notification to the corresponding Wi-Fi mobile terminal according to an IP address of the Wi-Fi mobile terminal and a port number of the Wi-Fi mobile terminal.

Alternatively, step 204: After the Wi-Fi device fails to connect to the wireless router, the Wi-Fi device changes the SSID of the Wi-Fi device, re-releases an updated SSID, and transfers a Wi-Fi configuration failure cause to the Wi-Fi mobile terminal by using the updated SSID.

Specifically, if the Wi-Fi device cannot successfully connect to the wireless router, the Wi-Fi device may change the SSID of the Wi-Fi device, for example, add a particular character to the SSID to indicate a specific connection failure cause, so that the Wi-Fi mobile terminal discovers the connection failure cause of the Wi-Fi device in time according to the updated SSID that is received.

According to the Wi-Fi configuration method provided in Embodiment 2 of this application, the Wi-Fi device releases the SSID that represents the identity of the Wi-Fi device; and after discovering the SSID through scanning, the Wi-Fi mobile terminal prompts, in time by using the user interface, the user that the Wi-Fi device is discovered, and guides the user to enable Wi-Fi configuration. In a scenario in which a plurality of Wi-Fi devices exist, this helps the user select a Wi-Fi device that needs to be configured. After obtaining the Wi-Fi networking parameters, the Wi-Fi mobile terminal constructs the information string and the plurality of multicast packets corresponding to the information string, and sends the Wi-Fi networking parameters to the Wi-Fi device by using the multicast packets, so that the Wi-Fi device sends the connection request to the wireless router corresponding to the Wi-Fi name and further establishes the connection to the wireless router. When the Wi-Fi device successfully connects to the wireless router, the Wi-Fi device feeds back the Wi-Fi configuration success notification message. When the connection fails, the Wi-Fi device feeds back the failure cause by changing the SSID, so that the Wi-Fi mobile terminal obtains a networking status of the Wi-Fi device in time. In this way, the user quickly completes initial networking configuration of the Wi-Fi device when the AP to which the Wi-Fi mobile terminal is connected is switched, so that a configuration time is short and user experience is good.

Figure 3:
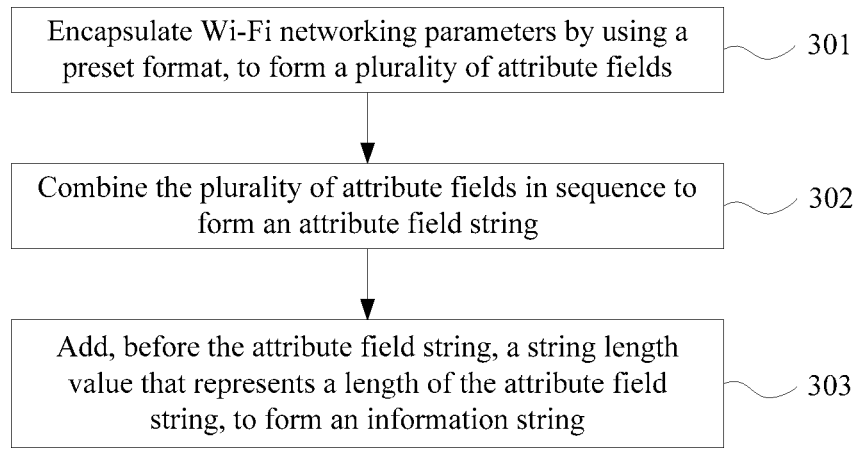
FIG. 3 is a schematic flowchart of Embodiment 3 of a Wi-Fi configuration method according to an embodiment of this application.

FIG. 3 is a schematic flowchart of Embodiment 3 of a Wi-Fi configuration method according to an embodiment of this application. Based on Embodiment 1 and/or Embodiment 2, this embodiment of this application further describes the Wi-Fi configuration method. This embodiment of this application is executed by the Wi-Fi mobile terminal. Specifically, as shown in FIG. 3, in the Wi-Fi configuration method provided in this embodiment of this application, step 102, that is, the constructing, by the Wi-Fi mobile terminal, an information string by using the Wi-Fi networking parameters, specifically includes the following steps.

Step 301: Encapsulate the Wi-Fi networking parameters by using a preset format, to form a plurality of attribute fields, where the preset format is a type-length-value TLV format or a length-value LV format.

It should be noted that a Wi-Fi mobile terminal uses a fixed attribute field format for external communication. The type-length-value TLV format or the length-value LV format may be used, but only devices that use a same attribute field format can communicate with each other. For example, if an attribute field format used by a Wi-Fi mobile terminal is the TLV format, an attribute field format used by a Wi-Fi device communicating with the Wi-Fi mobile terminal must also be the TLV format. However, in a device manufacturing process, attribute field formats set by different manufacturers may be different, and may be the TLV format, the LV format, or another format. A specific format of an attribute field is not limited in this embodiment of the present invention. The TLV format and the LV format are only used as examples for description herein.

In a Wi-Fi configuration process of the Wi-Fi device, the APP of the Wi-Fi mobile terminal may obtain the Wi-Fi networking parameters entered by the user, for example, information such as the Wi-Fi name (SSID) and the Wi-Fi password (Password). The Wi-Fi configuration process of the Wi-Fi device is a process in which the Wi-Fi mobile terminal sends the Wi-Fi networking parameters (for example, the attribute fields: the Wi-Fi name (SSID) and the Wi-Fi password (Password)) to the Wi-Fi device.

In this embodiment of this application, various attribute fields are represented by using the type (Type)-length (Length)-value (Value) format or the predefined and simplified length (Length)-value (Value) LV format. The following uses the TLV format as an example for description. Actually, different manufacturers have different representation methods. As shown below, Table 1 is a commonly used attribute structure.

TABLE 1

Commonly used attribute structure

| Name | Type | Description |
|---|---|---|
| Type | Unsigned Char(1) | An attribute field. For a value, refer to an "attribute field table". |
| Length | Unsigned Char(1) | A value indicating an actual length of content in "Value". |
| Value | String | A value corresponding to the attribute field. UTF-8 code is used, and an actual length is determined by "Length". |

Step 302: Combine the plurality of attribute fields in sequence to form an attribute field string.

It should be noted that, in addition to attribute fields such as the Wi-Fi networking parameters, the attribute field string may include another attribute field. A name of a specific included field is not limited in this application. As shown in Table 2, Table 2 is a structure of a string of a plurality of attribute fields.

TABLE 2

Structure of a string of a plurality of attribute fields

| T1 | L1 | V1 | ... | Tn | Ln | Vn |
|---|---|---|---|---|---|---|

Step 303: Add, before the attribute field string, a string length value that represents a length of the attribute field string, to form the information string.

(j) To enable the Wi-Fi device to easily process the attribute field string in the Wi-Fi configuration process, the string length value that represents the length of the attribute field string may be added before the attribute field string. The string length value indicates a sum of lengths of all attribute fields included in the attribute field string, and is located before the attribute field string and in a front part of the entire information string.

(k) According to the Wi-Fi configuration method provided in this embodiment of this application, the Wi-Fi networking parameters are encapsulated, the plurality of attribute fields are combined, and the information string is formed by processing the formed attribute field string. This facilitates parsing by the Wi-Fi device and shortens a Wi-Fi configuration time.

Figure 4:
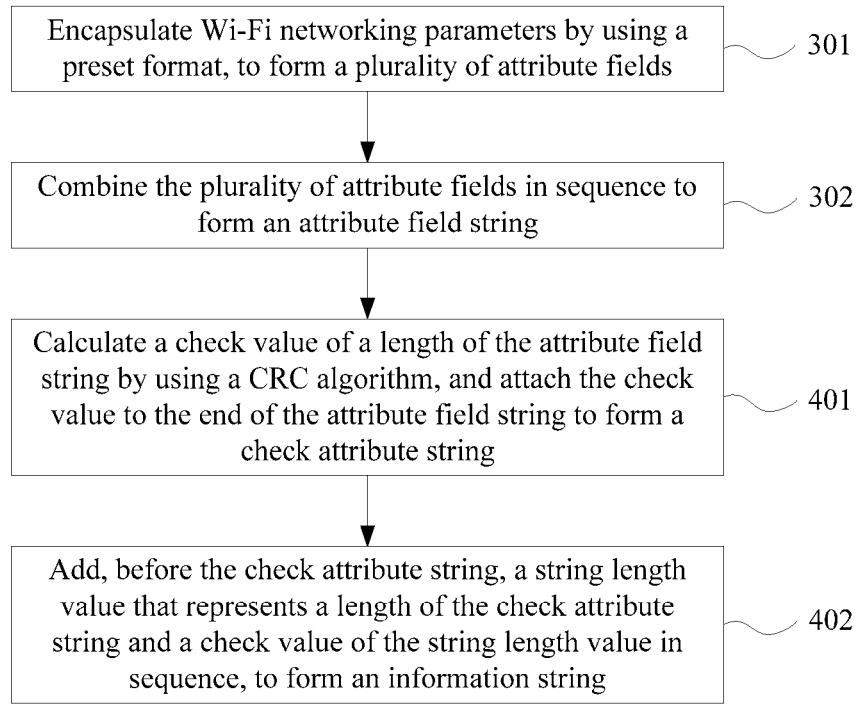
FIG. 4 is a schematic flowchart of Embodiment 4 of a Wi-Fi configuration method according to an embodiment of this application.

FIG. 4 is a schematic flowchart of Embodiment 4 of a Wi-Fi configuration method according to an embodiment of this application. Based on Embodiment 3, Embodiment 4 of this application further describes the Wi-Fi configuration method. This embodiment of this application is executed by the Wi-Fi mobile terminal. As shown in FIG. 4, after step 302, the Wi-Fi configuration method provided in this embodiment of this application further includes the following step:

Step 401: Calculate a check value of the length of the attribute field string by using a CRC algorithm, and attach the check value to the end of the attribute field string to form a check attribute string.

The cyclical redundancy check (Cyclical Redundancy Check, CRC for short) algorithm is a type of important linear block code. A basic idea is: By using a linear coding theory, an r-bit check code (that is, a CRC code) used for check is generated at a transmit end according to a particular rule and a to-be-transferred k-bit binary code sequence, and is attached to the end of the information string to construct a new binary code sequence number that includes a total of (k+r) bits; and the new binary code sequence number is finally sent. At a receive end, check is performed according to a rule followed between an information code and the CRC code, to determine whether an error occurs during transfer. Because of simple coding and decoding methods and strong error detection and correction capabilities, the CRC algorithm is widely used to implement error control in the communications field.

In this embodiment of this application, to ensure integrity of data transmission in the Wi-Fi configuration process, the 32-bit check value is calculated by using a CRC32 check algorithm, and is attached to the end of the attribute field string. Actually, a larger quantity of check bits leads to higher accuracy but a longer operation time. During specific implementation, a CRC algorithm, for example, a simplified CRC algorithm, may be selected according to an actual situation. A principle of the CRC check algorithm belongs to the prior art, and is not described in this embodiment of this application.

Correspondingly, step 303 may be described by using step 402.

Step 402: Add, before the check attribute string, a string length value that represents a length of the check attribute string and a check value of the string length value in sequence, to form the information string.

(1) Specifically, after the CRC value is calculated, the string length value that represents the length of the check attribute string and the check value (the CRC check value) of the string length value need to be added to the check attribute string to form the information string.

Further, before step 401, that is, the calculating a check value of the length of the attribute field string by using a CRC algorithm, and attaching the check value to the end of the attribute field string to form a check attribute string, the Wi-Fi configuration method provided in this embodiment further includes: performing encryption processing on the attribute field string to form an encrypted attribute string. Specifically, to ensure security of data transmission in the Wi-Fi configuration process, the attribute field string may be first encrypted and then sent after calculation and check are performed. The Wi-Fi device performs corresponding decryption. It should be noted that the encryption performed by the Wi-Fi mobile terminal and the decryption performed by the Wi-Fi device need to be specified in advance.

For example, an advanced encryption standard (Advanced Encryption Standard, AES for short) algorithm is used for encryption. The encryption algorithm enables symmetrical encryption. A sender and a receiver have a same key. The solution is simple, but security is relatively low. An RSA encryption algorithm uses a public-key cryptosystem. The so-called public-key cryptosystem uses different encryption keys and decryption keys, and is a cryptosystem in which "deriving a decryption key according to a known encryption key is infeasible in calculation". The encryption algorithm enables asymmetrical encryption and is more secure. However, an encryption process is complex, and a long time is consumed.

Optionally, if the encryption algorithm used in this embodiment of this application has a length requirement for the attribute field string, it is allowed to supplement the attribute field string with 0x0 before encryption. If the encryption algorithm requires that a length of an encrypted attribute field string be an odd number, one 0x0 is supplemented to the end of the encrypted attribute field string.

Correspondingly, step 401, that is, the calculating a check value of the length of the attribute field string by using a CRC algorithm, and attaching the check value to the end of the attribute field string to form a check attribute string, specifically includes:

calculating an encrypted check value of a length of the encrypted attribute string by using the CRC algorithm, and attaching the encrypted check value to the end of the encrypted attribute string, to form an encrypted check attribute string.

Correspondingly, to ensure integrity of data transmission in the Wi-Fi configuration process, the encrypted attribute string is formed after the attribute field string is encrypted, and the 32-bit encrypted check value of the length of the encrypted attribute string is calculated by using a CRC32 check algorithm, and is attached to the end of the encrypted attribute string, to form the encrypted check attribute string.

Correspondingly, step 402, that is, the adding, before the check attribute string, a string length value that represents a length of the check attribute string and a check value of the string length value in sequence, to form the information string, specifically includes:

adding, before the encrypted check attribute string, a string length value that represents a length of the encrypted check attribute string and a check value of the string length value in sequence, to form the information string.

Specifically, to enable the Wi-Fi device to easily process the encrypted check attribute string in the Wi-Fi configuration process, the string length value that represents the length of the encrypted check attribute string and the check value of the string length value also need to be added in sequence before the encrypted check attribute string, to form the information string. Table 3 lists a structure of an information string corresponding to an unencrypted attribute string. Table 4 lists a structure of an information string corresponding to an encrypted attribute string.

TABLE 3

Structure of an information string corresponding to an unencrypted attribute string

| String length value (total length) | Check value of the string length value | Attribute string | Check value of a length of a check attribute string |
|---|---|---|---|
| 4 bytes | 4 bytes (related to a bit quantity of a check algorithm) | Variable length | 4 bytes (related to a bit quantity of a check algorithm) |

TABLE 4

Structure of an information string corresponding to an encrypted attribute string

| String length value (total length) | Check value of the string length value | Encrypted attribute string | Check value of a length of an encrypted check attribute string |
|---|---|---|---|
| 4 bytes | 4 bytes (related to a bit quantity of a check algorithm) | Variable length | 4 bytes (related to a bit quantity of a check algorithm) |

A value storage and byte sending sequence is that all value fields are stored and sent according to a network byte sequence. For example, a length value 1 occupies four bytes, is stored as 0x00 00 00 01 in a memory, and is sequentially sent according to a sequence of 0x00, 0x00, 0x00, and 0x01.

Specifically, the information string is stored in the memory, and is read as a single-byte hexadecimal string byte by byte. The Wi-Fi mobile terminal reads the check information string, constructs the multicast packets, and sends the multicast packets so that the Wi-Fi device receives the multicast packets.

According to the Wi-Fi configuration method provided in this embodiment of this application, formats of all attribute fields in the Wi-Fi networking parameters and the attribute field string are determined, the attribute field string is encrypted by using the encryption algorithm and the CRC algorithm, and the CRC check value is added. This improves security of transmitting the Wi-Fi networking parameters and accuracy of data transmission.

Figure 5:
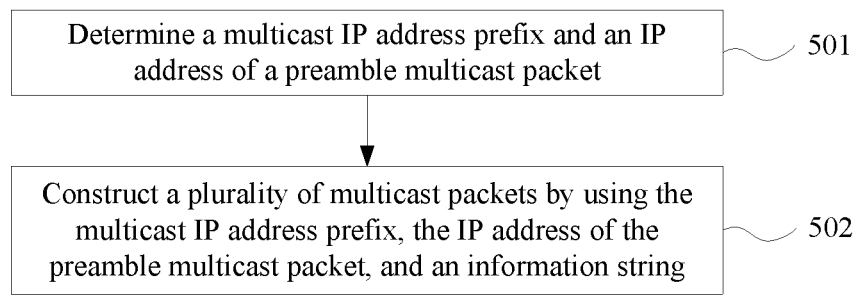
FIG. 5 is a schematic flowchart of Embodiment 5 of a Wi-Fi configuration method according to an embodiment of this application.

FIG. 5 is a schematic flowchart of Embodiment 5 of a Wi-Fi configuration method according to an embodiment of this application. Based on the foregoing embodiments, this embodiment of this application further describes the Wi-Fi configuration method. This embodiment of this application is executed by the Wi-Fi mobile terminal. Specifically, as shown in FIG. 5, in the Wi-Fi configuration method provided in this embodiment of this application, step 103, that is, the adding, by the Wi-Fi mobile terminal, information of the information string to a plurality of multicast packets, specifically includes the following steps.

Step 501: Determine a multicast IP address prefix and an IP address of a preamble multi cast packet.

Generally, the multicast IP address prefix may be 239.10, 239.20, or 239.30. An available multicast IP address prefix may be selected by testing each multicast IP address prefix, so as to avoid a problem that the information string cannot be sent because a multicast prefix is unavailable. In a process of cyclically sending the multicast packets carrying the information string, the multicast IP address prefix keeps unchanged. A most commonly used multicast IP address prefix is 239.10.

The last two bytes of the IP address of the preamble multicast packet or a MAC address of the preamble multicast packet are 1.1, 2.2, 3.3, or 4.4. As shown in Table 5, Table 5 lists a composition of a preamble multicast packet. It should be noted that a particular mapping relationship exists between a multicast IP address and an Ethernet MAC address. That is, in a multicast process, the last 23 bits of a multicast IP address are mapped onto the last 23 bits of a multicast MAC address, and the last two bytes are used to carry information in the multicast process.

TABLE 5

Composition of a preamble multicast packet

| Sequence number of a multicast packet | IP address of the multicast packet | MAC address of the multicast packet | Content of the multicast packet (content length) |
|---|---|---|---|
| 1 | 239.10.1.1 | 01:00:5e:0a:01:01 | "0" (1 byte) |
| 2 | 239.10.2.2 | 01:00:5e:0a:02:02 | "00" (2 bytes) |
| 3 | 239.10.3.3 | 01:00:5e:0a:03:03 | "000" (3 bytes) |
| 4 | 239.10.4.4 | 01:00:5e:0a:04:04 | "0000" (4 bytes) |

Step 502: Construct the plurality of multicast packets by using the multicast IP address prefix, the IP address of the preamble multicast packet, and the information string.

The last two types of a destination MAC address of each multicast packet carry some information of the information string, and a length value of each multicast packet carries a send sequence number.

The information string is stored in the memory and has been read as a single-byte hexadecimal string byte by byte. Therefore, every two consecutive single-byte hexadecimal numbers may be carried in the last two bytes of the last 23 bits of the destination MAC address of the multicast packet. Send sequence numbers of the multicast packets are identified by length values of the multicast packets. Further, when the Wi-Fi mobile terminal cyclically sends the multicast packets for a plurality of times, the Wi-Fi device can also identify a sending sequence of each multicast packet and further receive complete multicast packets.

For example, if an information string 0x01 02 03 04 05 06 0A 0B needs to be sent, the first four preamble multicast packets are first sent in sequence, and then byte content in the information string is sent in sequence. A composition of multicast packets of the information string is shown in Table 6. Table 6 lists the composition of the multicast packets of the information string.

TABLE 6

Composition of multicast packets of an information string

| Sequence number of a multicast packet | Information string byte | IP address of the multicast packet | MAC address of the multicast packet | Content of the multicast packet (content length) |
|---|---|---|---|---|
| 5 | 0x01 0x02 | 239.10.1.2 | 01:00:5e:0a:01:02 | "00000" (5 bytes) |
| 6 | 0x03 0x04 | 239.10.3.4 | 01:00:5e:0a:03:04 | "000000" (6 bytes) |
| 7 | 0x05 0x06 | 239.10.5.6 | 01:00:5e:0a:05:06 | "0000000" (7 bytes) |
| 8 | 0x0A 0x0B | 239.10.10.11 | 01:00:5e:0a:0a:0b | "00000000" (8 bytes) |
| ... | | | | |

According to the Wi-Fi configuration method provided in this embodiment of this application, the multicast IP address prefix and the IP address of the preamble multicast packet are selected, and the information of the information string is added to the last two bytes of the destination MAC addresses of the plurality of multicast packets respectively. This can improve a capability of identifying the Wi-Fi mobile terminal by the Wi-Fi device, so that the Wi-Fi device performs targeted reception.

Further, in the Wi-Fi configuration method provided in any one of the foregoing embodiments, the Wi-Fi networking parameters further include the IP address of the Wi-Fi mobile terminal and the port number of the Wi-Fi mobile terminal.

If the Wi-Fi networking parameters further include field values such as the IP address of the Wi-Fi mobile terminal and the port number of the Wi-Fi mobile terminal, after connecting to the wireless router, the Wi-Fi device disables SSID releasing and sends the Wi-Fi configuration success notification message to the Wi-Fi mobile terminal according to the obtained IP address and port number of the Wi-Fi mobile terminal and a value of a random character string field generated during sending.

Figure 6:
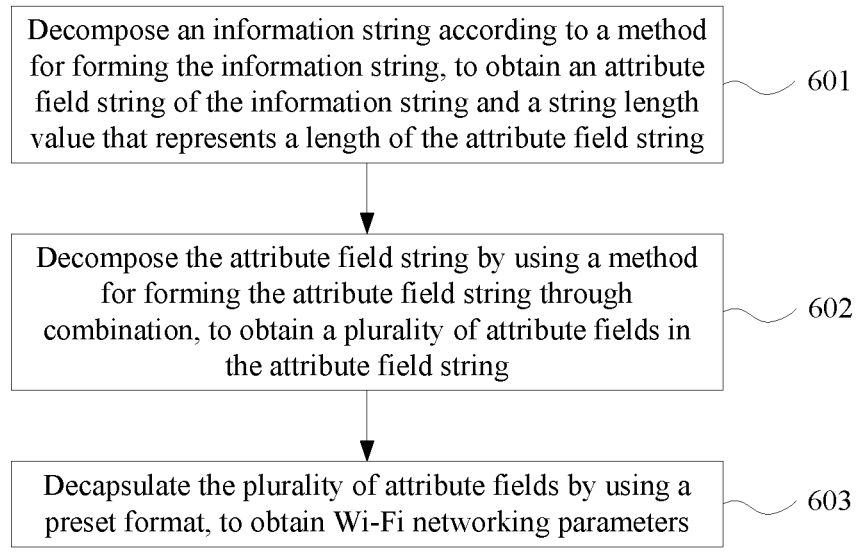
FIG. 6 is a schematic flowchart of Embodiment 6 of a Wi-Fi configuration method according to an embodiment of this application.

FIG. 6 is a schematic flowchart of Embodiment 6 of a Wi-Fi configuration method according to an embodiment of this application. Based on the foregoing embodiments, this embodiment of this application further describes the Wi-Fi configuration method. This embodiment of this application is executed by the Wi-Fi device. Specifically, as shown in FIG. 6, in the Wi-Fi configuration method provided in this embodiment of this application, step 106, that is, the decapsulating, by the Wi-Fi device, the information string according to a method for constructing the information string, to obtain the Wi-Fi networking parameters, specifically includes the following steps.

Step 601: Decompose the information string according to the method for constructing the information string, to obtain the attribute field string of the information string and the string length value that represents the length of the attribute field string.

When constructing the information string, the Wi-Fi mobile terminal adds, before the attribute field string, the string length value that represents the length of the attribute field string, to form the information string. Therefore, at a Wi-Fi device end, the Wi-Fi device may decompose the information string according to the method for constructing the information string, to obtain the attribute field string of the information string and the string length value that represents the length of the attribute field string.

Step 602: Decompose the attribute field string by using a method for forming the attribute field string through combination, to obtain the plurality of attribute fields in the attribute field string.

Specifically, the attribute field string is formed by combining the plurality of attribute fields. Therefore, the plurality of attribute fields in the attribute field string may be correspondingly obtained by decomposing the attribute field string.

Step 603: Decapsulate the plurality of attribute fields by using a preset format, to obtain the Wi-Fi networking parameters.

The attribute fields are formed by the Wi-Fi terminal by encapsulating the Wi-Fi networking parameters by using the preset format such as the TLV or the LV. According to a format specified between the Wi-Fi device and the Wi-Fi mobile terminal, the Wi-Fi device may obtain the Wi-Fi networking parameters by performing decapsulation by using the corresponding preset format.

According to the Wi-Fi configuration method provided in this embodiment of this application, the information string is decomposed according to the method for constructing the information string, to obtain the attribute field string of the information string and the string length value that represents the length of the attribute field string. The attribute field string is decomposed by using the method for forming the attribute field string through combination, to obtain the plurality of attribute fields in the attribute field string. The plurality of attribute fields are decapsulated by using the preset format, to obtain the Wi-Fi networking parameters. In this way, the Wi-Fi device can obtain the Wi-Fi networking parameters accurately and in time, and quickly complete initial networking configuration of the Wi-Fi device, so that efficiency is high.

Figure 7:
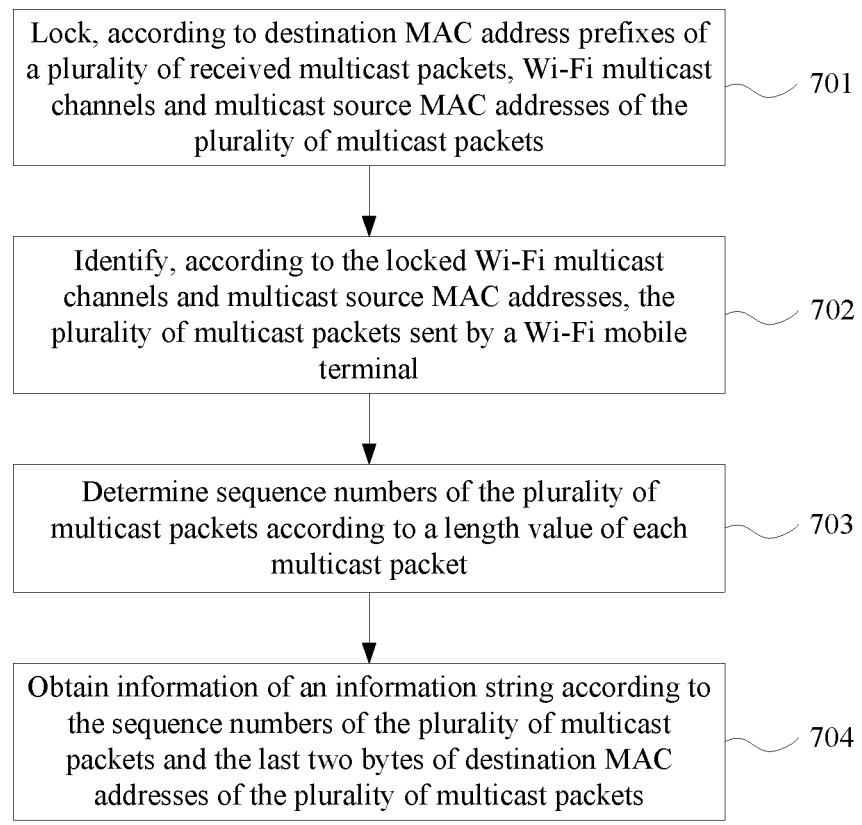
FIG. 7 is a schematic flowchart of Embodiment 7 of a Wi-Fi configuration method according to an embodiment of this application.

FIG. 7 is a schematic flowchart of Embodiment 7 of a Wi-Fi configuration method according to an embodiment of this application. Based on the foregoing embodiments, this embodiment of this application further describes the Wi-Fi configuration method. This embodiment of this application is executed by the Wi-Fi device. Specifically, as shown in FIG. 7, in the Wi-Fi configuration method provided in this embodiment of this application, step 105, that is, the receiving, by the Wi-Fi device, the plurality of multicast packets, and parsing the plurality of multicast packets according to a method for carrying the information string by the multicast packets, to obtain the information string from the plurality of multicast packets, specifically includes the following steps.

Step 701: Lock, according to destination MAC address prefixes of the plurality of received multicast packets, Wi-Fi multicast channels and multicast source MAC addresses of the plurality of multicast packets.

When the Wi-Fi device is in a to-be-configured state, the Wi-Fi device can receive a multicast packet. The Wi-Fi device receives the multicast packets sent by the Wi-Fi mobile terminal. Specifically, the Wi-Fi device has 2.4 G channels. When the Wi-Fi device is in a ready-to-receive state, the Wi-Fi device traverses China's domestic channel versions 1 to 13 corresponding to all the 2.4 G channels. The channel 1, the channel 6, and the channel 11 are most commonly used channels, and therefore, are preferentially traversed by using a doubled time.

The Wi-Fi device checks the plurality of received multicast packets, and locks the Wi-Fi multicast channels and the multicast source MAC addresses according to the destination MAC address prefixes of the received multicast packets. When the Wi-Fi mobile terminal constructs the multicast packets, multicast packet streams may be forwarded by the wireless router. Therefore, the Wi-Fi device needs to randomly select one multicast stream from a plurality of parallel multicast streams with different source MAC addresses, lock a multicast source MAC address corresponding to the multicast stream, and further receive only a multicast packet sent from the multicast source MAC address and ignore a multicast packet sent from another multicast source.

When the Wi-Fi mobile terminal constructs the multicast packets, a prefix of the preamble multicast packet of the multicast packets is 01:00:5e:0a, 01:00:5e:14, or 01:00:5e:1e. Therefore, if a destination MAC address prefix of a multicast packet received by the Wi-Fi device is 01:00:5e:0a, 01:00:5e:14, or 01:00:5e:1e (respectively corresponding to destination multicast IP addresses 239.10.x.x, 239.20.x.x, or 239.30.x.x), it indicates that the multicast packet received by the Wi-Fi device may be a multicast packet sent by the Wi-Fi mobile terminal, so that a Wi-Fi multicast channel and a multicast source MAC address of the multicast packet are locked. Optionally, whether an expected preamble multicast packet can be received or whether a multicast packet length value meets an expectation may be further checked. If a subsequently received multicast packet is the same as the expected preamble multicast packet or a length difference of a received multicast packet is the same as an expected multicast packet length difference, it may be confirmed that the locked Wi-Fi multicast channel and multicast source MAC address are correct.

Step 702: Identify, according to the locked Wi-Fi multicast channels and multicast source MAC addresses, the plurality of multicast packets sent by the Wi-Fi mobile terminal.

The Wi-Fi multicast channels and the multicast source MAC addresses are determined in step 701. Therefore, according to a characteristic that the last two bytes of the destination MAC addresses of the multicast packets carry the information of the information string, the Wi-Fi device can receive the plurality of multicast packets sent by the Wi-Fi mobile terminal, obtain, through analysis, the information that is of the information string and that is carried in the plurality of multicast packets, restore the Wi-Fi networking parameters by using the information of the information string, and then connect to the wireless router according to the Wi-Fi networking parameters.

Step 703: Determine sequence numbers of the plurality of multicast packets according to a length value of each multicast packet.

The length value of each multicast packet carries a send sequence number of the multicast packet. Therefore, the sequence numbers of the plurality of multicast packets can be determined by analyzing the length value of each multicast packet.

Step 704: Obtain the information of the information string according to the sequence numbers of the plurality of multicast packets and the last two bytes of destination MAC addresses of the plurality of multicast packets.

When constructing the multicast packets, the Wi-Fi mobile terminal adds the information string to the last two bytes of the destination MAC addresses of the plurality of multicast packets. Therefore, the information string can be obtained from the last two bytes of the destination MAC addresses of the plurality of multicast packets, and the Wi-Fi networking parameters are further obtained, so that the Wi-Fi device connects to the wireless router in time.

According to the Wi-Fi configuration method provided in this embodiment of this application, according to a characteristic of constructing the multicast packets, the Wi-Fi device first locks the Wi-Fi multicast channels and the multicast source MAC addresses of the plurality of multicast packets, receives the plurality of multicast packets sent by the Wi-Fi mobile terminal corresponding to the Wi-Fi multicast channels and the multicast source MAC addresses, determines the sequence numbers of the plurality of multicast packets, and finally obtains the information of the information string according to the sequence numbers of the plurality of multicast packets and the last two bytes of the destination MAC addresses of the plurality of multicast packets. According to the technical solution in this embodiment of this application, a capability of identifying the Wi-Fi mobile terminal by the Wi-Fi device is improved, so that the multicast packets sent by the Wi-Fi mobile terminal can be received in time, thereby shortening a Wi-Fi configuration time and achieving high efficiency.

Figure 8:
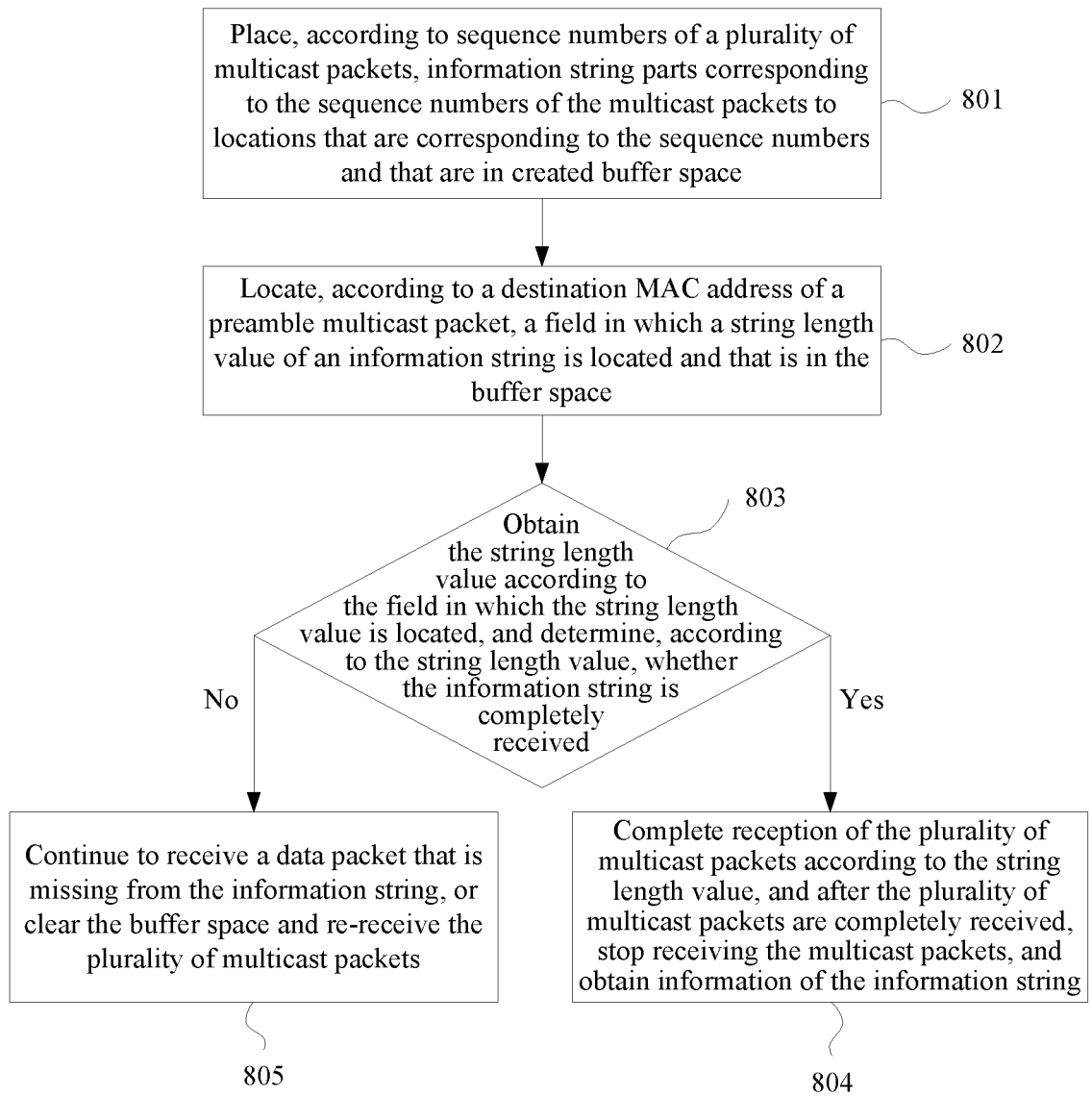
FIG. 8 is a schematic flowchart of Embodiment 8 of a Wi-Fi configuration method according to an embodiment of this application.

FIG. 8 is a schematic flowchart of Embodiment 8 of a Wi-Fi configuration method according to an embodiment of this application. Based on the foregoing embodiments, Embodiment 8 of this application further describes the Wi-Fi configuration method. This embodiment of this application is executed by the Wi-Fi device. As shown in FIG. 8, in the Wi-Fi configuration method provided in this embodiment of this application, step 704, that is, the obtaining the information of the information string according to the sequence numbers of the plurality of multicast packets and the last two bytes of destination MAC addresses of the plurality of multicast packets, specifically includes the following steps.

Step 801: Place, according to the sequence numbers of the plurality of multicast packets, information string parts corresponding to the sequence numbers of the multicast packets to locations that are corresponding to the sequence numbers and that are in created buffer space.

A length of the buffer space is greater than a total length of the plurality of multicast packets.

To receive the multicast packets sent by the Wi-Fi mobile terminal, the Wi-Fi device first creates buffer space with a specified length. For example, the buffer space may be a buffer with a specified length of 1038 bytes. A length of a multicast packet is known. Therefore, the length of the buffer space created in this application may be set according to an actual need, but the length of the buffer space needs to be greater than the total length of the plurality of multicast packets. A specific length is not limited in this application.

In this step, the Wi-Fi device places, according to the sequence numbers of the plurality of multicast packets, the information string parts corresponding to the sequence numbers of the multicast packets to the corresponding locations in the created buffer space. In a receiving process, if a sequence number of a received multicast packet already exists or exceeds the specified length of the buffer space, the multicast packet is discarded.

Step 802: Locate, according to a destination MAC address of the preamble multicast packet, a field in which a string length value of the information string is located and that is in the buffer space.

Specifically, it can be learned from the foregoing content that the attribute field string is formed by combining the plurality of attribute fields of the wireless router in sequence. The length of the attribute field string is the sum of the lengths of the plurality of attribute fields. The string length value that represents the length of the attribute field string is added before the attribute field string to form the information string, that is, the string length value is located before the attribute field string. Further, when a multicast packet is constructed, the multicast IP address prefix is added before the information string and an IP address of the multicast packet is determined. Therefore, the field, in which the string length value of the information string is located, is located after the multicast IP address prefix, before the attribute field string, and in the front part of the information string. Therefore, a location, in which the string length value of the information string is located, in the buffer space may be located according to the destination MAC address of the preamble multicast packet. Further, the Wi-Fi device determines, according to the string length value corresponding to the string length value field, whether the information string is completely received.

Step 803: Obtain the string length value according to the field in which the string length value is located, and determine, according to the string length value, whether the information string is completely received; and if yes, perform step 804; or if no, perform step 805.

Step 804: Complete the reception of the plurality of multicast packets according to the string length value, and after the plurality of multicast packets are completely received, stop receiving the multicast packets, and obtain the information of the information string.

Step 805: Continue to receive a data packet that is missing from the information string, or clear the buffer space and re-receive the plurality of multicast packets.

Specifically, the Wi-Fi device first determines, according to a multicast packet construction rule, whether the information string is completely received. If the information string is completely received, the Wi-Fi device completes the reception of the plurality of multicast packets according to the string length value, and after the plurality of multicast packets are completely received, stops receiving the multicast packets, and obtains the information of the information string from the last two bytes of the plurality of multicast packets. If the information string is not completely received, the Wi-Fi device continues to receive the data packet that is missing from the information string. If the information string is still not completely received in accumulative N periods, for example, accumulative 20 periods, the Wi-Fi device clears the buffer space, and re-receives the multicast packets from step 801.

According to the Wi-Fi configuration method provided in this embodiment of this application, the Wi-Fi device first creates the buffer space used to receive the multicast packets, receives the plurality of multicast packets according to the sequence numbers and length values of the multicast packets, and when the information string is completely received, obtains the information of the information string and further obtains the Wi-Fi networking parameters of the wireless router. This improves correctness of transmitting the information string and improves a probability of Wi-Fi configuration success.

Further, in the Wi-Fi configuration method provided in Embodiment 8, if the information string includes the string length value field that represents the length of the attribute field string and a check value field of the string length value, step 802, that is, the locating, according to a destination MAC address of the preamble multicast packet, a field in which a string length value of the information string is located and that is in the buffer space, specifically includes:

locating the string length value field of the information string and the check value field of the string length value according to the destination MAC address of the preamble multicast packet in the buffer space.

When the information string is constructed, the Wi-Fi mobile terminal further checks the attribute field string by using the CRC algorithm, and the check value field of the string length value is formed. Therefore, the Wi-Fi device in this embodiment should locate the string length value field of the information string and the check value field of the string length value according to the destination MAC address of the preamble multicast packet in the buffer space.

Correspondingly, after determining that the information string is completely received and before the stopping receiving the multicast packets, the method further includes:

comparing whether content of the check value field of the string length value is the same as a re-calculated check value of the string length value field; and if yes, completing the reception of the multicast packets according to the string length value, and after the multicast packets are completely received, stopping receiving the multicast packets, and obtaining the information of the information string; or if no, clearing the buffer space and re-receiving the multicast packets.

Specifically, after the information string is completely received, the check value of the received string length value is re-calculated according to the CRC check algorithm, and is compared with the content of the check value field of the string length value. If the re-calculated check value is the same as the content of the check value field of the string length value, it indicates that the information string is completely received and the string length value is correct. In this case, the Wi-Fi device completes the reception of the multicast packets according to the string length value, stops receiving the multicast packets after the multicast packets are completely received, and then obtains the Wi-Fi networking parameters of the wireless router from the information string. If the re-calculated check value is different from the content of the check value field of the string length value, the information string fails to be received, and the Wi-Fi device needs to clear the buffer space and re-receive the plurality of multicast packets.

Optionally, in the Wi-Fi configuration method provided in this embodiment, if the information string further includes an encrypted check value field of the length of the encrypted attribute string, after determining that the information string is completely received and before the stopping receiving the multicast packets, the method further includes:

comparing whether content of the encrypted check value field is the same as a re-calculated check value of the encrypted attribute string; and if the content of the encrypted check value field is the same as the re-calculated check value of the encrypted attribute string, completing the reception of the multicast packets according to the string length value, and after the multicast packets are completely received, stopping receiving the multicast packets, decrypting the obtained encrypted attribute string, and obtaining the Wi-Fi networking parameters in the information string; or if the content of the encrypted check value field is different from the re-calculated check value of the encrypted attribute string, clearing the buffer space and re-receiving the multicast packets.

Further, after successfully obtaining the information string, the Wi-Fi device obtains various attribute fields from the information string through parsing, for example, attribute fields such as the Wi-Fi name "SSID" and the Wi-Fi password "Password". The Wi-Fi device attempts to connect to the wireless router by using the obtained SSID and Wi-Fi password. If the connection is successful, the Wi-Fi device stops receiving the multicast packets and disables SSID releasing.

Further, in the Wi-Fi configuration method provided in any one of the foregoing embodiments, if the Wi-Fi networking parameters include attribute fields such as the IP address of the Wi-Fi mobile terminal "AppIP", the port number of the Wi-Fi mobile terminal "AppPort", and a random character string "Token", after connecting to the wireless router, the Wi-Fi device needs to disable the SSID immediately and send an online notification to the mobile phone APP according to obtained values of the "AppIP", "AppPort", and "Token" fields.

The Wi-Fi mobile terminal is used as a server: A protocol is TCP, a listening IP address is the value of the "AppIP" field, and a listening port is the value of the "AppPort" field.

The Wi-Fi device is used as a client: A protocol is TCP, a target IP address is the value of the "AppIP" field, a target port is the value of the "AppPort" field, and content of the sent online notification packet includes a "Token" field string, an SSID string (a router SSID), and the like.

If the Wi-Fi device fails to connect to the router, the Wi-Fi device changes the SSID of the Wi-Fi device immediately, re-releases the updated SSID, and transfers the failure cause to the Wi-Fi mobile terminal by using the updated SSID. The Wi-Fi mobile terminal obtains the failure cause by using the SSID that is obtained through scanning, and allows enabling a new round of configuration.

Further, in the Wi-Fi configuration method provided in any one of the foregoing embodiments, the Wi-Fi networking parameters further include a value of a "Device SN" attribute field indicating a serial number of the Wi-Fi device. The Wi-Fi device further needs to determine whether the SN of the Wi-Fi device is the same as the value of the "Device SN" attribute field. If the SN of the Wi-Fi device is the same as the value of the "Device SN" attribute field, it indicates that the Wi-Fi device is a configuration object selected by the user, and further, the Wi-Fi device obtains the Wi-Fi networking parameters and connects to the wireless router. If the SN of the Wi-Fi device is different from the value of the "Device SN" attribute field, it indicates that the Wi-Fi device is not a configuration object selected by the user, and the Wi-Fi device needs to discard the received attribute string and enable multicast reception again.

An embodiment of this application further provides a Wi-Fi mobile terminal. The Wi-Fi mobile terminal includes an obtaining module, a construction module, a carrying module, and a sending module. A method and functions of the Wi-Fi mobile terminal in the foregoing embodiments are performed by using the obtaining module, the construction module, the carrying module, and the sending module, and are implemented by hardware/software of the Wi-Fi mobile terminal. The hardware/software includes units corresponding to the foregoing functions.

An embodiment of this application further provides a Wi-Fi device. The Wi-Fi device includes a receiving module, a packet parsing module, a decapsulation module, and a connection module. A method and functions of the Wi-Fi device in the foregoing embodiments are performed by using the receiving module, the packet parsing module, the decapsulation module, and the connection module, and are implemented by hardware/software of the Wi-Fi device. The hardware/software includes units corresponding to the foregoing functions.

Figure 9:
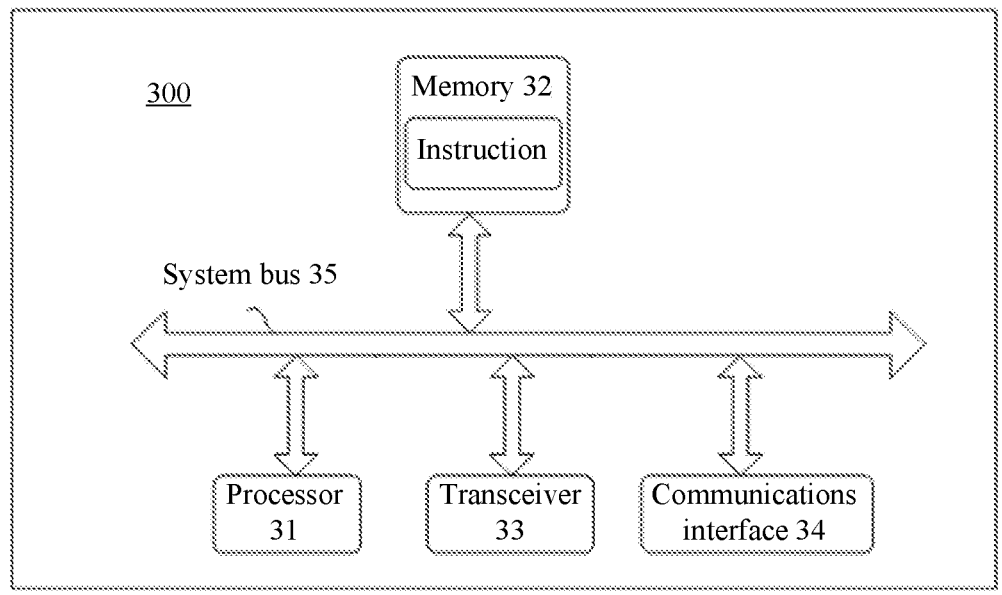
FIG. 9 is a schematic structural diagram of an embodiment of a Wi-Fi mobile terminal according to an embodiment of this application.

FIG. 9 is a schematic structural diagram of an embodiment of a Wi-Fi mobile terminal according to an embodiment of this application. The Wi-Fi mobile terminal 300 provided in this embodiment includes a processor 31, a memory 32, a transceiver 33, a communications interface 34, and a system bus 35. The memory 32 and the communications interface 34 connect to and communicate with the processor 31 and the transceiver 33 by using the system bus 35. The memory 32 is configured to store a computer-executable instruction. The communications interface 34 is configured to communicate with another device. The processor 31 and the transceiver 33 are configured to run the computer-executable instruction, so that the Wi-Fi mobile terminal 300 performs various steps of the foregoing method applied to a Wi-Fi mobile terminal.

Figure 10:
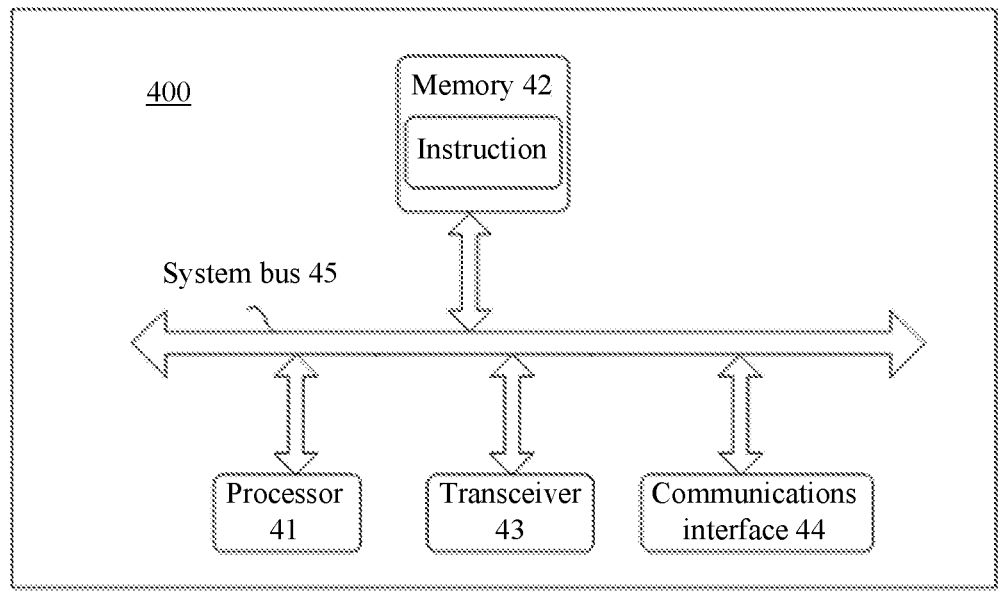
FIG. 10 is a schematic structural diagram of an embodiment of a Wi-Fi device according to an embodiment of this application.

FIG. 10 is a schematic structural diagram of an embodiment of a Wi-Fi device according to an embodiment of this application. The Wi-Fi device 400 provided in this embodiment includes a processor 41, a memory 42, a transceiver 43, a communications interface 44, and a system bus 45. The memory 42 and the communications interface 44 connect to and communicate with the processor 41 and the transceiver 43 by using the system bus 45. The memory 42 is configured to store a computer-executable instruction. The communications interface 44 is configured to communicate with another device. The processor 41 and the transceiver 43 are configured to run the computer-executable instruction, so that the Wi-Fi device 400 performs various steps of the foregoing method applied to a Wi-Fi device.

The system bus mentioned in FIG. 9 and FIG. 10 may be a peripheral component interconnect (peripheral component interconnect, PCI) bus, an extended industry standard architecture (extended industry standard architecture, EISA) bus, or the like. The system bus may be classified into an address bus, a data bus, a control bus, and the like. For ease of representation, only one bold line is used to represent the bus in the figure, but this does not mean that there is only one bus or only one type of bus. The communications interface is configured to implement communication between a database access apparatus and another device (such as a client, a read/write database, or a read-only database). The memory may include a random access memory (random access memory, RAM), or may include a non-volatile memory (non-volatile memory), for example, at least one disk memory.

The processor may be a general-purpose processor, including a central processing unit (Central Processing Unit, CPU), a network processor (Network Processor, NP), and the like; or may be a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or transistor logic device, or a discrete hardware component.

Optionally, an embodiment of this application provides a Wi-Fi configuration system. The system includes the Wi-Fi mobile terminal, the Wi-Fi device, and the wireless router in the foregoing embodiments. The Wi-Fi device establishes a connection to the wireless router by using the Wi-Fi mobile terminal.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof. Therefore, the protection scope of this application shall be subject to the protection scope of the claims.

What is claimed is:

1. A Wi-Fi configuration method comprising:
externally releasing a service set identifier (SSID), to trigger a Wi-Fi mobile terminal to discover a Wi-Fi device through scanning;
receiving a plurality of multicast packets, wherein the plurality of multicast packets carry an information string, the information string carries Wi-Fi networking parameters, and the Wi-Fi networking parameters comprise attribute fields: a Wi-Fi name and a Wi-Fi password of a wireless router to which the Wi-Fi device is to be connected to;
locking, according to destination MAC address prefixes of the plurality of multicast packets, Wi-Fi channels and multicast source MAC addresses that are of the plurality of multicast packets;
identifying, according to the locked Wi-Fi channels and multicast source MAC addresses, the plurality of multicast packets sent by the Wi-Fi mobile terminal;
determining sequence numbers of the plurality of multicast packets according to a length value of each multicast packet;
placing, according to the sequence numbers of the plurality of multicast packets, information string parts corresponding to the sequence numbers of the multicast packets to locations that are corresponding to the sequence numbers and that are in created buffer space, wherein a length of the created buffer space is greater than a total length of the plurality of multicast packets;
locating, according to a destination MAC address of a preamble multicast packet, a field in which a string length value of the information string is located and that is in the created buffer space;
obtaining the string length value according to the field in which the string length value is located, and determining, according to the string length value, whether the information string is completely received;
when the information string is completely received, completing the reception of the plurality of multicast packets according to the string length value, and after the plurality of multicast packets are completely received, stopping receiving the plurality of multicast packets, and obtaining the information of the information string;
decomposing the information string according to a method for constructing the information string to obtain an attribute field string of the information string and a string length value that represents a length of the attribute field string;
decomposing the attribute field string according to a method for forming the attribute field string through combination to obtain a plurality of attribute fields in the attribute field string;

decapsulating the plurality of attribute fields using a preset format to obtain the Wi-Fi networking parameters; and sending, according to the Wi-Fi networking parameters, a connection request to a wireless router corresponding to the Wi-Fi name to establish a connection to the wireless router.

2. The method according to claim 1, further comprising:

after the Wi-Fi device fails to connect to the wireless router, changing the service set identifier (SSID) of the Wi-Fi device, re-releasing an updated SSID, and transferring a Wi-Fi configuration failure cause to the Wi-Fi mobile terminal using the updated SSID.

* * * * *